United States Patent [19]

Murphy

[11] Patent Number: 4,590,882
[45] Date of Patent: May 27, 1986

[54] SHACKLES

[76] Inventor: Jack J. Murphy, Chapel Elms, Chapel Lane, West Wittering, West Sussex, England

[21] Appl. No.: 587,725

[22] Filed: Mar. 8, 1984

[30] Foreign Application Priority Data

Mar. 8, 1983 [GB] United Kingdom ............... 8306381

[51] Int. Cl.[4] ............................................ B63H 9/08
[52] U.S. Cl. ..................... 114/108; 24/241 SL; 59/89; 294/82.34
[58] Field of Search ............... 59/86, 88, 89; 114/108; 24/241 SL, 232 R, 241 PS; 294/82.34; 403/349

[56] References Cited

U.S. PATENT DOCUMENTS

| 768,090 | 8/1904 | Sweetland | 24/241 PS |
|---|---|---|---|
| 967,141 | 8/1910 | Merriman | 24/241 PS |
| 1,686,424 | 10/1928 | Thomson et al. | 24/232 |
| 3,341,907 | 9/1967 | Michael | 114/108 X |
| 3,811,157 | 5/1974 | Schenk | 403/349 X |
| 3,850,468 | 11/1974 | Hultin | 294/83 R |
| 3,911,671 | 10/1975 | Guillen | 59/89 |
| 4,401,333 | 8/1983 | Merry | 24/241 SL |

Primary Examiner—Sherman D. Basinger
Attorney, Agent, or Firm—Cushman, Darby & Cushman

[57] ABSTRACT

This invention relates to shackles.

In more detail a shackle comprises a body component and a latch component wherein the latch component includes a latch arm hinged to the body component to form a closed loop therewith when latched, the latch arm having that end thereof remote from the hinge shaped for engagement with the body and to restrain opening from a latched position, a plunger housed within the body and movable against a biassing force between a first position in which the plunger extends into the latch arm to hold the latch arm in a latched position and a second position in which the plunger is withdrawn to permit opening of the latch arm, and wherein the body component includes a bore which communicates with an enlarged space, the bore serving, in use, to receive a stopper knot which prevents removal of the rope through the bore.

11 Claims, 13 Drawing Figures

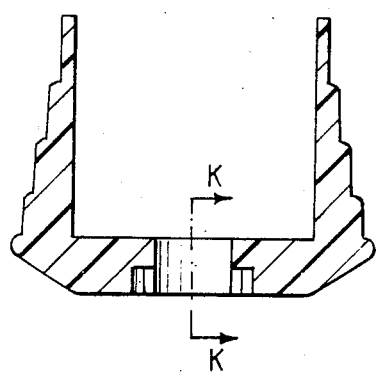
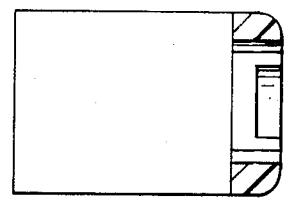
Fig.9. Fig.10.
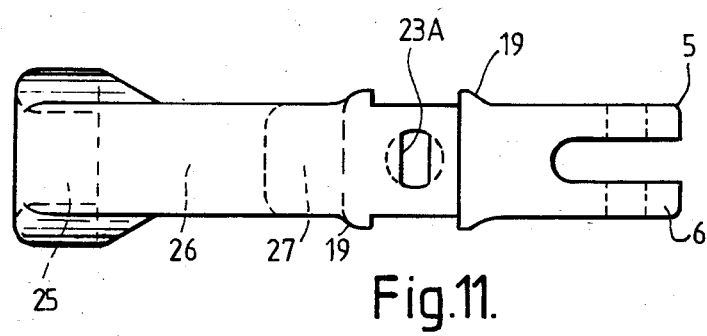
Fig.11.
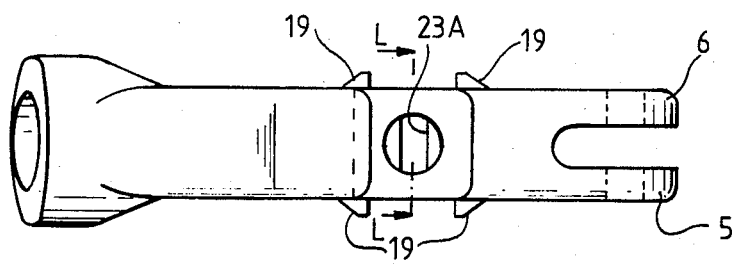
Fig.12.

SHACKLES

This invention relates to shackles. More particularly, the invention relates to light weight shackles for use with spinnakers and other sails of sailing vessels as well as for use with sheets, guys, ropes etc. The shackles according to the present invention are also suitable for use in non-sailing applications and may be used for releasably connecting a rope or the like to any other article.

BACKGROUND OF THE INVENTION

Shackles per se are well known items of chandlery and marine hardware and are frequently made from metallic materials chosen to withstand the corrosive nature of a marine environment. It is a preferred requirement that shackles designed for use with both yachts and larger displacement seagoing vessels, should include a swivel connection so as to permit relative angular displacement between items releasably connected by the shackle. To this end, it is common practice for a shackle to include a swivel eye component which is rotatably connected to a releasable latch component. The releasable latch component usually comprises two members, namely, a first member which constitutes a body and which carries both the swivel eye component and a hinged latch member of the releasable latch component. The hinged latch member may be held in a closed position by means of a spring biassed plunger housed in the body and engageable in a hole formed in the hinged latch member.

Such known shackles are well tried and accepted pieces of marine hardware but, since they are made from metallic materials they are necessarily relatively heavy. It is an object of the present invention to provide a shackle which possesses all the advantages of the above and briefly described metallic swivel/releasable latch shackle but which is lighter in weight, which overcomes the necessity of a swivel eye and which will withstand the corrosive nature of a marine environment.

BRIEF DESCRIPTION OF THE INVENTION

According to the present invention a shackle comprises a body component and a latch component wherein the latch component includes a latch arm hinged to the body component to form a closed loop therewith when latched, a plunger housed within the body and movable against a biassing force between a first position in which the plunger extends into the latch arm to hold the latch arm in a latched position and a second position in which the plunger is withdrawn to permit opening of the latch arm, and wherein the body component includes a bore which communicates with an enlarged space, the bore serving, in use, to receive a portion of a rope and the enlarged space serving to receive a stopper knot which prevents removal of the rope through the bore.

Preferably, the latch arm has that end thereof remote from the hinge shaped for engagement with the body and to restrain opening from the latched position. The end of the latch arm remote from the hinge is, preferably, located, when closed, in a rebate or other cut out formed in the body component. Engagement between the latch arm and the body is achieved by means of an inclined face formed on the end of the latch arm and a correspondingly shaped face in the rebate or other cut out formed on the body. Preferably, the inclined faces are approximately tangential to an arc drawn from the hinge of the latch arm such that, during opening and closing movement of the latch arm, the faces slide out of and into engagement. When engaged, the inclined faces cooperate to restrain opening in a direction transverse to the usual force applied to the shackle. The usual force is generally longitudinal of the rope attached to the shackle. In other words the force is generally inline with, for example, the clew of a sail to which the shcakle is attached and the rope (or sheet) attached to the shackle. In use, therefore, little or no force is applied transversely of the said longitudinal force to unlatch the shackle.

Preferably, the plunger is biassed into the first position by a compression or tension spring.

In use, when it is intended to attach a rope to the shackle, the rope is fed through the bore and a half- or stopper knot is formed in the rope end which has been fed through the bore. The so formed knot is located in the enlarged space formed in the body and constitutes a stop which prevents removal of the rope from the shackle via the bore. The enlarged space may be a hole formed in the body component of the shackle or it may be a blind hole opening into a face of the body component. Since the formation of a half- or stopper-knot requires a short "tail" of rope to remain after the knot has been tied, a cut-out is formed as an extension of the enlarged space to accommodate the "tail".

The bore/enlarged space combination overcomes the necessity for the shackle to include a swivel eye because any swivel movement required is available by virtue of the inherent property of the rope to twist within itself.

Since shackles are used on board yachts and other seagoing vessels during all weather conditions, it is highly desirable that a shackle should be capable of being latched and unlatched by a sailor with cold and possibly wet fingers. In an attempt to overcome this problem a lanyard is sometimes attached to the plunger. It is a feature of the present invention that the plunger is attached to a bridge member which can be gripped between a finger and thumb of one hand. Conveniently, the bridge member is of "U" shaped cross-section which straddles the body of the shackle with the legs of the "U" movable in guides or between shoulders formed on opposite faces of the body and with the connecting base of the "U" attached to the plunger. The legs of the "U" shaped bridge may include a number of ridges or other non-slip surface configuration permitting an easy grip between finger and thumb.

Although the shackle according to the invention may be made from any suitable metallic material, we prefer to use a plastics material such as DELRIN (RTM) or polypropylene. If desired, other plastics materials may be used and these may be loaded with metallic particles or reinforced with other materials such as carbon fibres.

DESCRIPTION OF THE DRAWINGS

Shackles in accordance with the present invention will now be described by way of example with reference to the accompanying drawings in which:

FIG. 9 is a section of the bridge of FIG. 8 taken on line H—H;

FIG. 10 is a section of the bridge of FIG. 9 taken on line K—K;

FIGS. 11 and 12 are views from opposite directions of the body of the shackle of FIGS. 6 and 7, and, FIG. 13 is a section taken on line L—L of FIGS. 7 and 12.

DETAILED DESCRIPTION OF THE INVENTION

Figure 1:
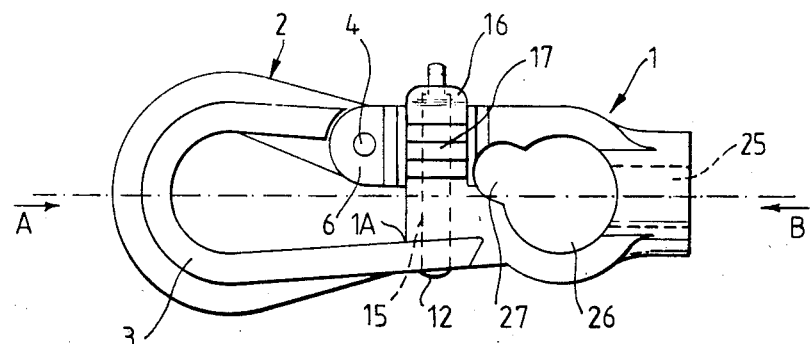
FIG. 1 is a side view of one form of shackle.
Figure 2:
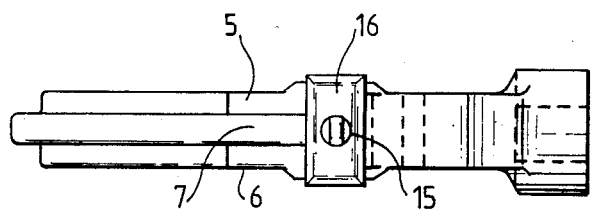
FIG. 2 is a plan of FIG. 1.
Figure 3:
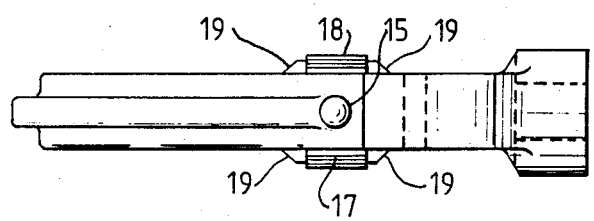
FIG. 3 is an under plan of FIG. 1.
Figure 4:
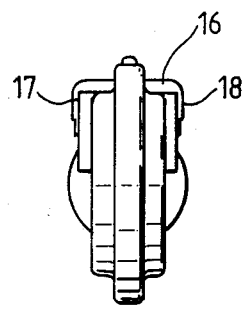
FIGS. 4 and 5 are end views taken in the direction of arrows A and B of FIG. 1.
Figure 5:
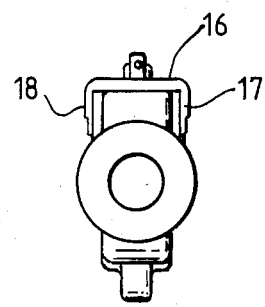

The shackle of FIGS. 1 to 5 has a body component 1 and a latch component 2. The latch component 2 has a latch arm 3 which is hinged to the body by means of a forked hinge joint and hinge pin 4. The forked hinge joint comprises two prongs 5 and 6 formed on the body 1 and a mating tongue 7 formed on the latch arm 3.

In the closed position as shown in FIG. 1, end portion 8 of the latch arm is located in a rebate 9 formed in the body 1. The end portion 8 and the rebate 9 are each formed with an inclined and correspondingly shaped face 10 and 11 respectively. The faces 10 and 11 are, as shown, inclined to longitudinal axis X—X of the shackle and, to permit opening and closing of the latch as well as restraining opening of the latch when closed, the inclined faces are substantially tangential to an arc drawn from the centre of the hinge pin 4.

A spring biassed plunger 12 housed with a bore 13 formed in the body 1 is movable against the bias of a spring 14 between a first position in which the plunger extends into an aperture 15 formed in the latch arm 3 to hold the latch arm 3 in a latched position and a second position in which the plunger is withdrawn into the body 1 to permit opening of the latch arm 3.

The plunger 12 is detachably secured to a U-shaped bridge 16 which straddles the body 1 and legs 17,18 are movable between shoulders 19 formed on opposite faces of the body. As shown, the legs 17 and 18 are strapped to form a number of ridges permitting an easy grip between finger and thumb to operate the plunger 12.

Figure 8:
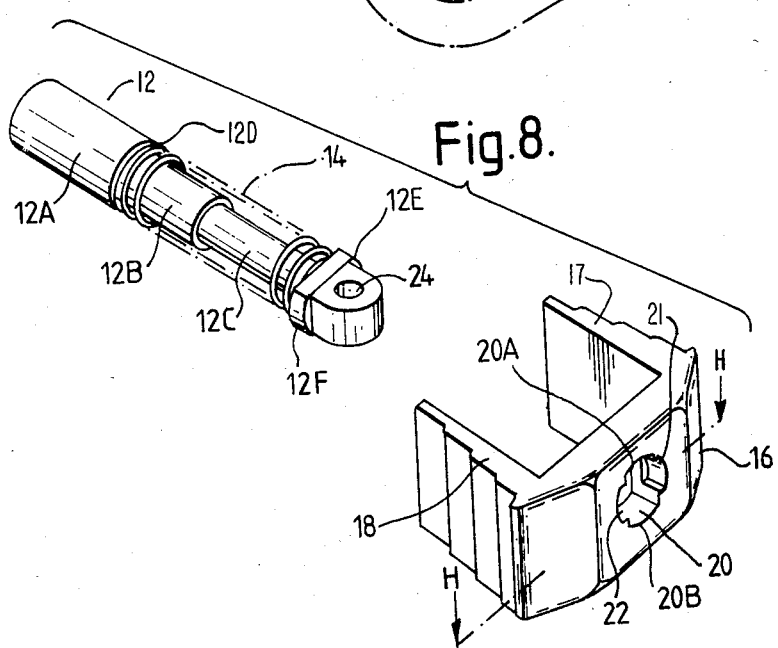
FIG. 8 is an exploded view of a plunger/bridge arrangement.

The plunger 12/bridge 15 arrangement is shown to an enlarged scale and exploded in FIG. 8. The plunger 12 has three cylindrical parts 12A, 12B and 12C of progressiively reduced diameters. The diameter of part 12A is an easy fit within the hole 15 formed in the latch arm 3, and a shoulder 12D formed between parts 12 and 12B acts as a stop for compression spring 14. A further stop for the compression spring is constituted by diametrically opposed projections 12E and 12F on the plunger 12. Further, the part 12B forms a guide for the spring and the reduced part 12C, being less than the internal diameter of the spring reduces friction between the spring 14 and the plunger 12 during compression of the spring.

The bridge 16 (see FIG. 8) is formed with a slotted through hole 20 with curved ends 20A, 20B and diametrically opposed cut-outs 21 and 22 which are shaped to receive the diametrically opposed projections 12E and 12F. Attachment of the plunger 12 to the bridge is accomplished by turning the plunger through 90° relative to the position shown in FIG. 8, passing projections 12E/12F through the slotted hole 20, turning the plunger once more through 90° so that the projections 12E/12F are aligned with cut-outs 21 and 22 and, thereafter, forcing projections 12E/12F into the cut-outs 21/22.

Figure 7:
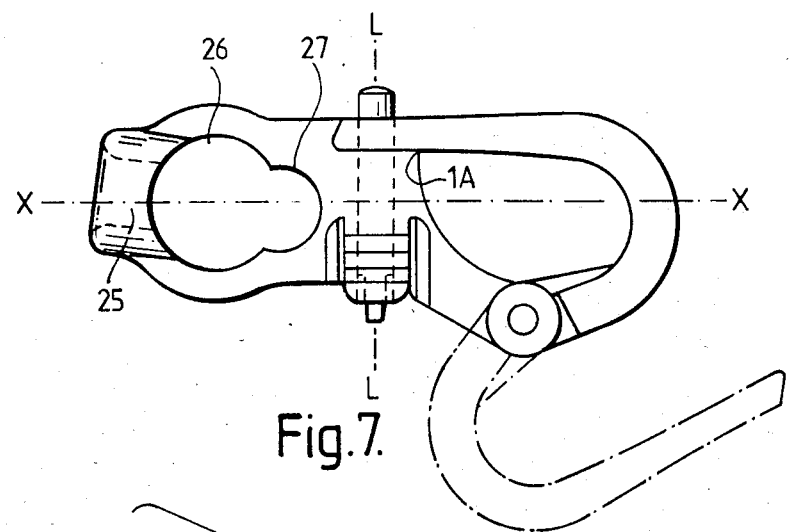
Figure 13:
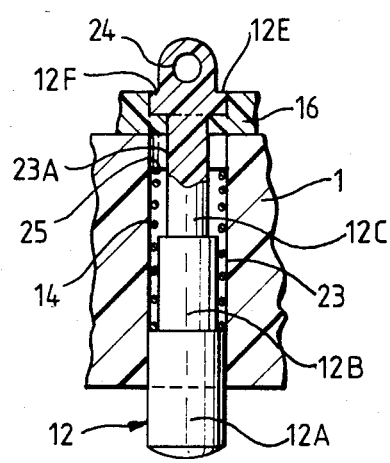

As shown in FIGS. 7, 12 and 13 the plunger 12 is housed in a bore 23 which affords an easy fit for part 12A of the plunger. The bore 23 has a slotted end 23A which is shaped to accept the projections 12E/12F and corresponds in shape to and is aligned with the slotted through-hole 20 in the bridge 16. A through bore 24 is formed in the end of the plunger as indicated for attachment of a lanyard.

To assemble the shackle, the plunger 12 is inserted into the bore 23, the projections 12E/12F are turned into alignment with the slot 23A, passed through the slotted hole 20 of the bridge and the procedure previously described with respect to the bridge followed. In the assembled position (see FIG. 13) the spring 14 is positioned between the shoulder 12D and the shoulder 25 which is formed because the slotted end 23A is less than the diameter of the bore 23.

Figure 6:
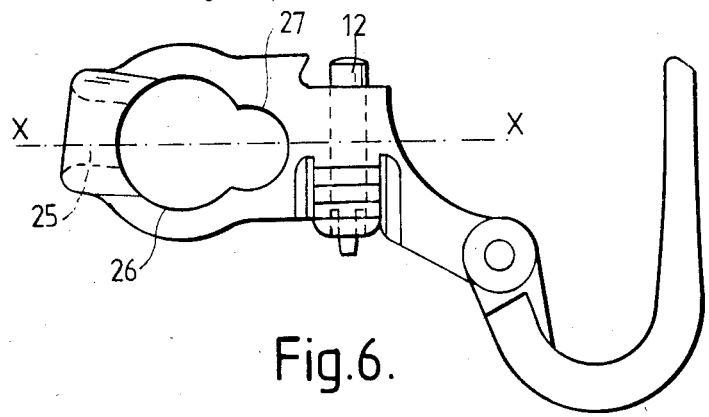
FIGS. 6 and 7 show a further embodiment of shackle according to the invention.

As shown in FIGS. 1, 6 and 7, the body component 1 has a bore 25 which communicates with a hole 26 which opens into a cut-out 27. In use a rope is passed through the bore 25, and a knot e.g. a half knot is formed on the rope. The knot is then forced into the hole 26 and any "tail" of rope remaining after tying the knot is accommodated in the cut-out 27.

It will be seen by comparing the shackles of FIGS. 1 to 5 and 6–7 that they open to different amounts. The full extent of the opening of the shackles according to FIGS. 6 and 7 is shown in dotted lines on FIG. 7, and this is greater than that of the shackles of FIG. 1. The greater the opening of a shackle does have the advantage of quick-release when used in connection with for example a spinnaker sail. Further it will be seen that the bore 25 of the shackle of FIG. 1 is co-axial with axis XX whereas in the shackle of FIGS. 6–7 the axis of the bore 25 is inclined to the axis XX.

As mentioned previously, the shackles according to the present invention are made from a plastics material. The use of a plastics material such as DELRIN (RTM) or polypropylene is advantageous in that such material possesses inherent resilience. During movement of the latch arm 3 into the closed position, corner 1A of the body forms a slight obstruction to the confronting part of the latch arm 3 thereby placing the latch arm 3 under stress insofar that the hooked shape of the latch arm is opened or widened somewhat. Thus, when the plunger is withdrawn to permit opening of the latch, relief of the said stress serves to produce a force which assists in opening of the shackle just as though the opening was spring loaded.

I claim:

1. A shackle comprising a body component and a latch component wherein the latch component includes a latch arm hinged to the body component to form a closed loop therewith when latched, a plunger housed within a bore formed in the body and movable against a biassing force between a first position in which the plunger extends into the latch arm to hold the latch arm in the latched position and a second position in which the plunger is withdrawn to permit opening of the latch arm about the hinge, a releasing handle for displacing the plunger into the second position, the releasing handle having the form of a U-shaped bridge which straddles the body component with the legs of the bridge movable between shoulders formed on opposite faces of the body component, and a connecting means for detachably connecting the handle to the plunger, the connecting means comprising an aperture extending through the handle, a notch extending radially outwardly from the aperture wall and having a depth which is less than the axial length of the aperture, the plunger including a head with a projection extending radially outwardly therefrom and having a shape which engages said notch, the head and the projection together having a shape permitting passage through the aperture whereupon, after passage through the aperture, angular movement of the head permits engagement of said projection in said notch and, when so engaged, movement of the handle against the biassing force displaces the plunger between the said first and second positions, to open the latch.

2. A shackle according to claim 1 wherein that end of the latch arm remote from the hinge is located, when closed, in a cut-out formed in the body component.

3. A shackle according to claim 2 wherein the said end of the latch arm and the said cut-out each include an inclined and correspondingly shaped face, the said face of the latch arm and the cut-out engaging with each other to restrain opening from the latched position.

4. A shackle according to claim 3 wherein each said inclined face is approximately tangential to an arc drawn from the hinge of the latch arm such that during opening and closing movement of the latch arm, the inclined faces slide into and out of engagement.

5. A shackle according to claim 4 wherein, when engaged, the said inclined faces cooperate to restrain opening of the latch arm in a direction to the usual force applied to the shackle.

6. A shackle according to claim 1 made from a plastics material.

7. A shackle according to claim 6 wherein during movement of the latch arm into the latched position, a portion of the latch arm abuts a portion of the body thereby placing the latch arm under stress whereby, when the plunger is withdrawn to permit opening of the latch, the relief of the said stress serves to produce a force which assists opening of the shackle.

8. A snap shackle comprising:
a body component including a bore formed therein,
a latch component including a latch arm hinged to said body at one end and having a plunger engaging means at its other end,
a spring-loaded plunger mounted in the bore of the body,
a first end of said plunger engaging said plunger-engaging means of said latch component, and a second end thereof protruding from said body and forming a head of the plunger,
a releasing handle for disengaging said plunger from said latch component,
a slot in said releasing handle,
the said second end of said plunger protruding from the said body through a slot disposed perpendicularly to said slot in said releasing handle,
the said head of said plunger having a cross-piece for engaging the sides of said slot in said releasing handle,
whereby, by angular displacement of said plunger through a right angle, the cross-piece may be passed through said slot in the releasing handle to disengage the plunger from said releasing handle and to permit withdrawal of the plunger from said body.

9. A shackle comprising a body component and a latch component wherein the latch component includes a latch arm hinged to the body component to form a closed loop therewith when latched, a plunger housed within a bore formed in the body and movable against a biassing force between a first position in which the plunger extends into the latch arm to hold the latch arm in the latched position and a second position in which the plunger is withdrawn to permit opening of the latch arm about the hinge, a releasing handle for displacing the plunger into the second position, the releasing handle having the form of a U-shaped bridge which straddles the body component with the legs of the bridge movable between shoulders formed on opposite faces of the body component, and a connecting means for detachably connecting the handle to the plunger, the connecting means comprising an aperture extending through the handle, two diametrically disposed notches extending radially outwardly from the aperture wall and having a depth which is less than the axial length of the aperture, the plunger including a head having two opposed projections extending radially outwardly therefrom and having a shape which engaged with the said diametrically disposed notches, the head and the said two opposed projections together having a shape permitting passage through the aperture whereupon, after passage through the aperture, angular movement of the head permits engagement of the said projections with the said notches and, when so engaged, movement of the handle against the biassing force displaces the plunger between the said first and second positions, to open the latch.

10. A snap shackle comprising:
a body component including a bore formed therein,
a latch component including a latch arm hinged to said body at one end and having a plunger engaging means at its other end,
a spring-loaded plunger mounted in the bore of the body,
a first end of said plunger engaging said plunger-engaging means of said latch component, and a second end thereof protruding from said body and forming a head of the plunger,
a releasing handle for disengaging said plunger from said latch component, the releasing handle having the form of a U-shaped bridge which straddles the body component with the legs of the U-shaped bridge movable between shoulders formed on opposite faces of the body,
a slot in said releasing handle,
the said second end of said plunger protruding from the said body through a slot disposed perpendicularly to said slot in said releasing handle,
the said head of said plunger having a cross-piece for engaging the sides of said slot in said releasing handle,
whereby, by angular displacement of the plunger through a right angle, the cross-piece may be passed through said slot in the releasing handle to disengage the plunger from said releasing handle and to permit withdrawal of the plunger from said body.

11. A snap shackle comprising:
a body component including a bore formed therein,
a latch component including a latch arm hinged to said body at one end and having a plunger engaging means at its other end,
a spring-loaded plunger mounted in the bore of the body, a first end of said plunger engaging said plunger-engaging means of said latch component, and a second end thereof protruding from said body and forming a head of the plunger, a releasing handle for disengaging said plunger from said latch component, the releasing handle having the form of a U-shaped bridge which straddles the body component with the legs of the U-shaped bridge movable between shoulders formed on opposite faces of the body a slot in said releasing handle, the said head of said plunger having a cross-piece for engaging the sides of said slot in said releasing handle, whereby, by angular displacement of the plunger through a right angle, the cross-piece may be passed through said slot in the releasing handle to disengage the plunger from said releasing handle and to permit withdrawal of the plunger from said body.

* * * * *